(12) United States Patent
Peattie et al.

(10) Patent No.: US 11,345,588 B2
(45) Date of Patent: May 31, 2022

(54) FLUID DISPENSING OR RECOVERY SYSTEM

(71) Applicant: WALNAB PTY LTD, New South Wales (AU)

(72) Inventors: Adam Peattie, New South Wales (AU); João Curado Silveirinha, New South Wales (AU); Niran Varma, New South Wales (AU); Chris Kim, New South Wales (AU)

(73) Assignee: WALNAB PTY LTD, New South Wales (AU)

( * ) Notice: Subject to any disclaimer, the term of this patent is extended or adjusted under 35 U.S.C. 154(b) by 0 days.

(21) Appl. No.: 17/274,719

(22) PCT Filed: Sep. 10, 2019

(86) PCT No.: PCT/AU2019/050970
§ 371 (c)(1),
(2) Date: Mar. 9, 2021

(87) PCT Pub. No.: WO2020/051634
PCT Pub. Date: Mar. 19, 2020

(65) Prior Publication Data
US 2021/0347631 A1 Nov. 11, 2021

(30) Foreign Application Priority Data
Sep. 10, 2018 (AU) .............................. 2018903386

(51) Int. Cl.
*B67D 7/34* (2010.01)
*B60K 15/04* (2006.01)
(Continued)

(52) U.S. Cl.
CPC ........... *B67D 7/0401* (2013.01); *B67D 7/348* (2013.01); *B67D 7/425* (2013.01); *B60K 15/04* (2013.01); *B67D 2007/0444* (2013.01)

(58) Field of Classification Search
CPC  B67D 7/348; B67D 7/425; B67D 2007/0444; B60K 15/04
See application file for complete search history.

(56) References Cited

U.S. PATENT DOCUMENTS 5,913,180 A  6/1999  Ryan
10,520,136 B2 * 12/2019 Johnson ........... B60K 15/03006
(Continued)

FOREIGN PATENT DOCUMENTS

AU  737046 B2  8/2001
AU  737066 B2  8/2001
(Continued)

OTHER PUBLICATIONS

International Search Report issued by ISA/AU in connection with PCT/AU2019/050970 dated Dec. 9, 2019.
(Continued)

*Primary Examiner* — Jason K Niesz
(74) *Attorney, Agent, or Firm* — Levenfeld Pearlstein, LLC

(57) ABSTRACT

A fluid dispensing system generally comprising a dispensing nozzle coupled to a supply conduit; the dispensing nozzle detachably connected to a receiver; a receiver identification device associated with the receiver; an electrical identification circuit being contact-based and including the receiver identification device; an electronics module connected to the supply conduit and arranged to communicate with the electrical identification circuit whereby connection of the dispensing nozzle to the receiver completes the electrical identification circuit and permits communication of at least
(Continued)

a unique receiver identifier associated with the receiver identification device to the electronics module.

20 Claims, 12 Drawing Sheets

(51) Int. Cl.
  *B67D 7/04* (2010.01)
  *B67D 7/42* (2010.01)

(56) References Cited

U.S. PATENT DOCUMENTS

| | | |
|---|---|---|
| 2010/0180983 A1* | 7/2010 | Hashim ................. B60K 15/04 141/347 |
| 2010/0265033 A1 | 10/2010 | Cheung |
| 2011/0272046 A1 | 11/2011 | Peattie et al. |

FOREIGN PATENT DOCUMENTS

| | | |
|---|---|---|
| WO | 0103983 A1 | 1/2001 |
| WO | 03104135 A1 | 12/2003 |

OTHER PUBLICATIONS

Written Opinion issued by ISA/AU in connection with PCT/AU2019/050970 dated Dec. 9, 2019.
International Preliminary Report on Patentability issued by ISA/AU in connection with PCT/AU2019/050970 dated Jan. 11, 2021.
Written Opinion issued by ISA/AU in connection with PCT/AU2019/050970 dated Oct. 16, 2020.

\* cited by examiner

FLUID DISPENSING OR RECOVERY SYSTEM

This is a National Stage Application of International Patent Application No. PCT/AU2019/050970, filed Sep. 10, 2019, which claims the benefit of and priority to Australian (AU) Patent Application No. 2018903386 filed Sep. 10, 2018, the entireties of which are incorporated fully herein by reference.

TECHNICAL FIELD

The present invention relates broadly to a fluid dispensing system as well as a fluid recovery system.

BACKGROUND

Fuel management systems fall within the more general field of fluid dispensing systems. A typical fuel management system is a combination of hardware and software products designed to enable security, access and control of fuel stores, whilst monitoring delivery and consumption. On the delivery side, a robust system should provide accurate and transparent data disclosure ensuring that the fuel or other fluid received accurately matches that delivered. On the dispensing side, the system should efficiently and securely dispense fuel or other fluid.

The applicant has designed fuel management systems which set out to provide these essential features. At the heart of these systems there are dispensing nozzles of either a dry-break or splash fill design. These nozzles are used in conjunction with compatible receivers to provide the efficient and secure delivery of fuel with a reduced risk of theft.

The applicant's Australian patent no. 737046 illustrates one example of a dry-break nozzle/receiver suitable for inclusion in a secure fuel management system. The receiver is uniquely identified with an ID chip and this is communicated via a hardwired electrical identification circuit to a monitoring system. The electrical identification circuit includes a data wire passing through the nozzle and inside a fuel hose connected to the nozzle. The electrical identification circuit is only complete when a poppet valve of the dry-break nozzle engages and opens a poppet valve of the receiver wherein the receiver (or vehicle to which it is installed) is identified. The monitoring system may only permit refuelling on valid identification of the vehicle. The applicant in Australian patent no. 737066 describes a similar arrangement in both a splash fill and dry-break configuration. The electrical identification circuit is once again hardwired including a data wire extending from the nozzle and through the associated fuel hose back to the monitoring system.

International patent publication No. WO 03/104135 is broadly directed to a vehicle fuelling management system including a dispensing nozzle having a coupling element configured to connect to a fuel tank coupling element in a dry-break arrangement. The tank coupling element includes a data storage device including vehicle ID data which on insertion of the nozzle into the tank coupling element is sent to a signal receiver mounted to the nozzle. The vehicle ID or other stored data may be sent to the signal receiver of the nozzle by wired or wireless communication. The signal receiver then wirelessly communicates bi-directionally with a processor assembly located at a fuel dispenser. The processor, relying on data received from the signal receiver at the nozzle, thus controls operation of the fuel dispenser and its fuel dispensing activity.

International patent publication No. WO 01/003983 is directed to a fuel dispensing system including a fuel dispensing nozzle of a splash-fill design. The splash-fill nozzle includes a nozzle and an associated handle to which an RF module is mounted. The vehicle includes an RFID tag near its fuel inlet spout into which the splash-fill nozzle is inserted. The RFID tag at close range to the dispensing nozzle is interrogated by the RF module and returns a signal including stored data such as vehicle ID from the RFID tag. The dispensing system includes an interrogator which wirelessly interrogates the RF module which forwards its stored data to the interrogator which in turn sends the stored data to a pump controller. The pump controller, depending on the stored data it receives from the interrogator, controls dispensing of fuel via a fuel dispenser associated with the dispensing nozzle.

SUMMARY OF INVENTION

According to a first aspect of the present invention there is provided a fluid dispensing system comprising:

a dispensing nozzle coupled to a supply conduit for dispensing fluid from a fluid supply associated with the supply conduit;

a receiver adapted to couple to a fluid recipient, the dispensing nozzle being detachably connected to the receiver for dispensing the fluid from the fluid supply and delivering it to the fluid recipient;

a receiver identification device associated with the receiver, said identification device configured to provide recipient data including a unique receiver identifier associated with the fluid recipient;

an electrical identification circuit being contact-based and including the receiver identification device;

an electronics module connected to the supply conduit and arranged to communicate with the electrical identification circuit whereby connection of the dispensing nozzle to the receiver completes the electrical identification circuit and permits communication of at least the unique receiver identifier to the electronics module.

Preferably the fluid dispensing system also comprises a controller arranged to communicate with the electronics module to receive data obtained from the recipient data and delivered from the electronics module whereby dispensing of the fluid from the fluid supply is controlled by the controller depending on validation of the received data. More preferably the electronics module includes a processor operatively coupled to a wireless transmitter arranged to wirelessly send the data to a wireless data receiver associated with the controller. Even more preferably the processor is configured to receive the recipient data and process it to obtain the data sent to the controller. Still more preferably the electronics module includes a power source operatively coupled to the processor and the wireless transmitter to power them.

Preferably the fluid dispensing system also comprises a nozzle identification device associated with the dispensing nozzle, said identification device configured to provide nozzle data including a unique nozzle identifier associated with the dispensing nozzle which is sent to the electronics module at the supply conduit. More preferably the electronics module is arranged to communicate with the controller to deliver data obtained from the nozzle data to the controller whereby fluid transfer to the dispensing nozzle is authorised depending on validation of the delivered data. Still more preferably the nozzle identification device includes a nozzle identification tag arranged to provide the nozzle data to the electronics module at the supply conduit. Even more preferably the data obtained from the nozzle data is wirelessly communicated to the controller via a wireless transmitter of the electronics module for validation of the dispensing nozzle at the controller to authorise fluid transfer via the dispensing nozzle.

According to a second aspect of the invention there is provided a fluid recovery system comprising:

a recovery nozzle connected to a delivery conduit for delivering fluid to a fluid recipient associated with the delivery conduit;

a receiver adapted to couple to a fluid supply, said receiver being detachably connected to the recovery nozzle for recovering the fluid from the fluid supply and delivering it to the fluid recipient;

a receiver identification device associated with the receiver, said identification device configured to provide supply data including a unique receiver identifier associated with the fluid supply;

an electrical identification circuit being contact-based and including the receiver identification device;

an electronics module connected to the delivery conduit and arranged to communicate with the electrical identification circuit whereby connection of the recovery nozzle to the receiver completes the electrical identification circuit and permits communication of at least the unique receiver identifier to the electronics module.

Preferably the fluid recovery system also comprises a controller arranged to communicate with the electronics module to receive data obtained from the supply data and delivered from the electronics module whereby recovery of the fluid from the fluid supply is controlled by the controller depending on the received data. More preferably the electronics module includes a processor operatively coupled to a wireless transmitter arranged to wirelessly send the data to a wireless data receiver associated with the controller. Even more preferably the processor is configured to receive the supply data and to process it to obtain the data sent to the controller. Still more preferably the electronics module includes a power source operatively coupled to the processor and the wireless transmitter to power them.

Preferably the fluid recovery system also comprises a nozzle identification device associated with the recovery nozzle, said identification device configured to provide nozzle data including a unique nozzle identifier associated with the recovery nozzle which is sent to the electronics module at the delivery conduit. More preferably the electronics module is arranged to communicate with the controller to deliver data obtained from the nozzle data to the controller whereby fluid transfer at the recovery nozzle is authorised depending on validation of the delivered data. Still more preferably the nozzle identification device includes a nozzle identification tag arranged to send the nozzle data to the electronics module at the delivery conduit. Even more preferably the data obtained from the nozzle data is wirelessly communicated to the controller via a wireless transmitter of the electronics module for validation of the recovery nozzle at the controller to authorise fluid transfer via the recovery nozzle.

Preferably the receiver identification device includes a receiver identification tag forming part of the electrical identification circuit. More preferably the electrical identification circuit is hardwired to the electronics module via the nozzle for completion of said circuit on connection of the nozzle to the receiver.

Preferably the nozzle and the receiver are of a dry-break design. More preferably the dry-break nozzle and the receiver are compatible to permit connection.

Preferably the supply conduit includes a coupling assembly connected directly to the nozzle, the electronics module being located at the coupling assembly. More preferably the coupling assembly is detachably fitted to the nozzle wherein removal of the coupling assembly from the nozzle breaks the electrical identification circuit. Alternatively the coupling assembly is integral with the nozzle. Even more preferably the supply conduit includes a line detachably fitted to the coupling assembly. Still more preferably the system further comprises an anti-theft feature extending between the electronics module and the line whereby removal of the line from the coupling assembly activates the anti-theft feature which is then communicated from the electronics module to the controller to allow predetermined actions such as the termination of fluid transfer via the line.

BRIEF DESCRIPTION OF DRAWINGS

In order to achieve a better understanding of the nature of the present invention preferred embodiments of a fluid dispensing system or a fluid recovery system will now be described, by way of example only, with reference to the accompanying drawings in which.

DETAILED DESCRIPTION

Figure 1:
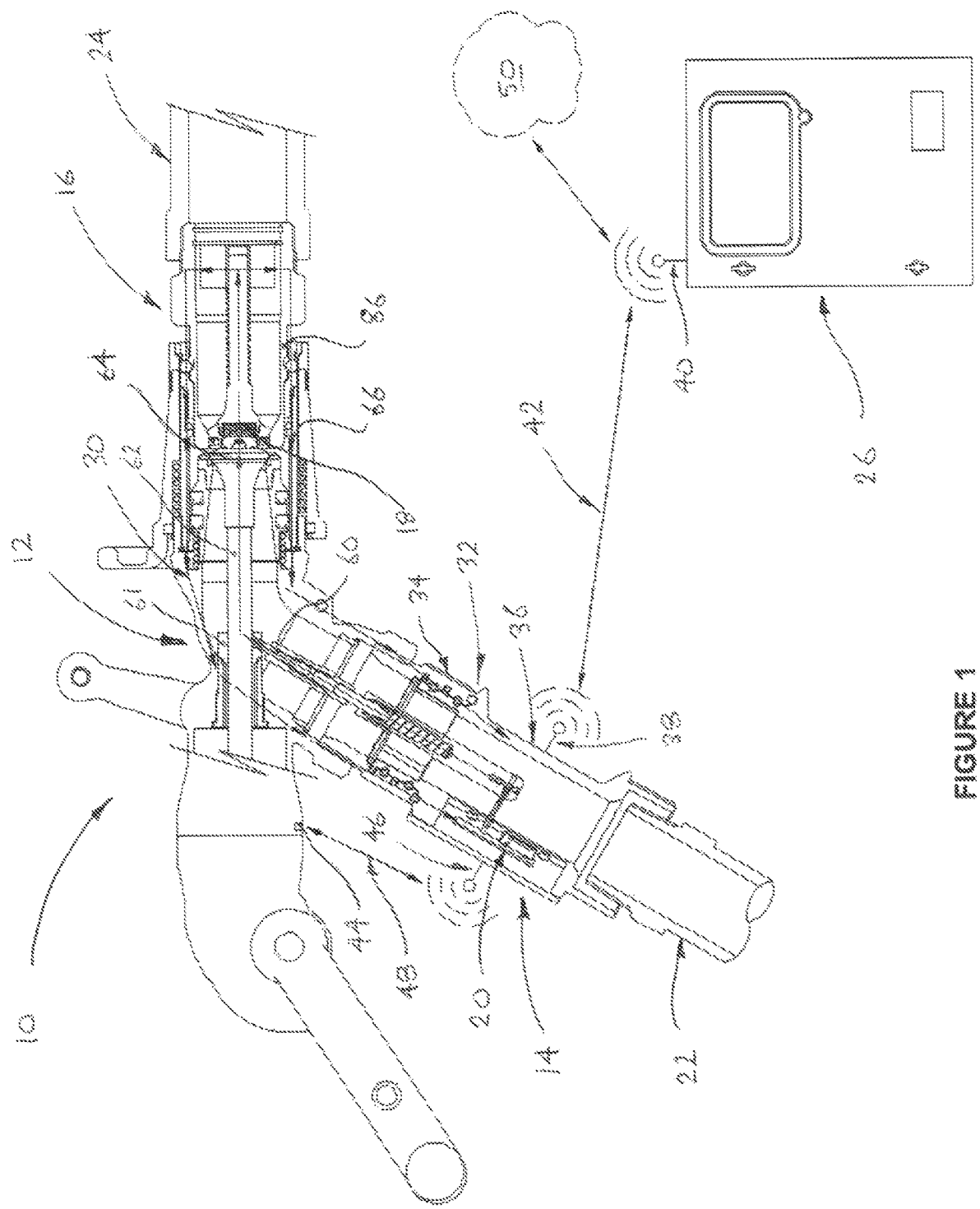
FIG. 1 is part sectional view of a fluid dispensing system according to a preferred embodiment of one aspect of the invention.
Figure 2:
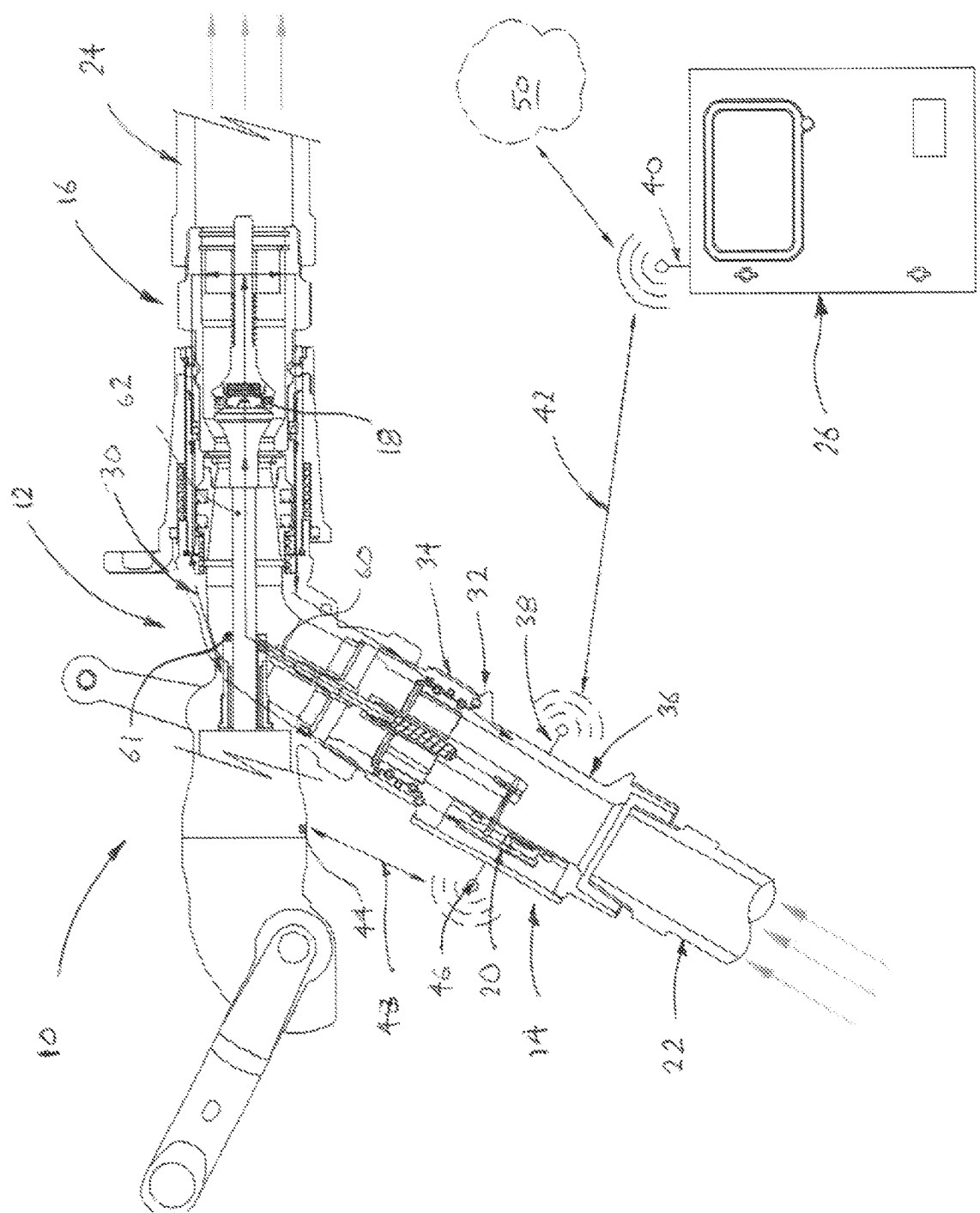
FIG. 2 is a part sectional view of the fluid dispensing system of FIG. 1 with the dispending nozzle moved from its closed to open position.

As best seen in FIGS. 1 and 2 there is a fluid dispensing system 10 according to a preferred embodiment of one aspect of the invention. The fluid dispensing system 10 generally comprises:

1. a dispensing nozzle 12 coupled to a supply conduit 14;
2. the dispensing nozzle 12 detachably connected to a receiver 16;
3. a receiver identification device 18 associated with the receiver 16;
4. an electronics module 20 associated with the supply conduit 14.

In this aspect the supply conduit 14 is associated with a fluid supply (not shown) via a supply line 22 for dispensing fluid from the fluid supply. The receiver 16 couples to a fluid recipient (not shown) via a delivery coupling 24 for dispensing the fluid from the fluid supply and delivering it to the fluid recipient. The fluid recipient of this embodiment may take the form of a vehicle, tank, or other plant equipment. The delivery coupling is sealably connected to the fluid recipient either directly or indirectly via a fluid transfer line which connects to the fluid recipient.

In another aspect of the invention (not illustrated) there is a fluid recovery system being of similar construction to the fluid dispensing system 10 and configured for recovering fluid from a fluid supply and delivering it to a fluid recipient via a recovery nozzle detachably connected to a receiver associated with the fluid supply. The fluids to which the preferred embodiment applies includes but is not limited to compressible or incompressible fluids as well as flammable or non-flammable fluids, such as fuels, hydrocarbons, and water. Although the preferred embodiment is limited to a fluid dispensing system the invention in both of its aspects extends to other assets.

In this embodiment of the dispensing system 10, the receiver identification device 18 is configured to provide recipient data including a unique receiver identifier associated with the receiver 16. On connection of the dispensing nozzle 12 to the receiver 16, the recipient data including at least the unique receiver identified is communicated from the receiver identification device 18 to the electronics module 20. The fluid dispensing system 10 also comprises a controller 26 arranged to communicate with the electronics module 20. In particular, data obtained from recipient data including at least the unique receiver identifier of the receiver identification device 18 is delivered to the controller 26 from the electronics module 20. This data sent to the controller 27 thus controls dispensing of the fluid from the fluid supply via the dispensing nozzle 12. In this example, this control is effected by comparing and validating the data received at the controller 26 with corresponding data stored at the controller 26 and associated with the receiver 16 or fluid recipient.

The dispensing nozzle 12 and the receiver 16 of this embodiment are both normally closed or sealed and as such are of a dry-break design. The dry-break nozzle 12 and the associated receiver 16 are keyed or otherwise mechanically connected to one another. This means there may be an array of receivers where each receiver is only compatible with a nozzle of the same design. This provides a means of having multiple receivers where each receiver design is keyed or otherwise assigned to a specific nozzle and fluid type to avoid such problems as cross-contamination of different fluid types. Put another way, whether dispensing or recovering, variations of the mating elements of the nozzle and a compatible receiver may be used as a means of providing a mechanical "key" between a nozzle and receiver, whereby dissimilar keys prevent the connection of a nozzle and receiver.

In this embodiment, the receiver identification device 18 is in the form of a receiver identification tag forming part of an electrical identification circuit 30. It will be apparent from FIGS. 1 and 2 that the electrical identification circuit 30 is contact-based and only completes on connection of the dispensing nozzle 12 to the receiver 16. The electrical identification circuit 30 is hardwired to the electronics module 20 via the receiver 16, the dispensing nozzle 12, and the supply conduit 14. This hardwired arrangement enhances the security of the system, specifically the security of fluid dispensing.

The receiver identification tag 18 includes the unique receiver identifier in the form of a unique receiver ID code assigned within the system 10 to only the associated receiver 16. This provides a means within the system 10 to identify each of the receivers such as 16. Once the electrical identification circuit 30 is completed and energised, the circuit 30 obtains the ID code from the receiver 16 and transfers it via the dispensing nozzle 12 to the electronics module 20 within the supply conduit 14. The circuit 30 may transfer other data strings associated with the fluid recipient from the receiver 16 to the electronics module 20. The receiver identification tag 18 thus provides a means within the system 10 to associate each unique receiver such as 16 to a specific vehicle, plant equipment, or other asset with which the receiver 16 is associated. The hardwired identification circuit 30 is of a single wire configuration used for the recognition of the unique ID code for the receiver such as 16 via the connected nozzle 12. The identification circuit 30 may be configured to accept data from other sources for hardwired communication to the electronics module 20 including for example vehicle engine hours. The receiver 16 may incorporate additional electronic data storage means including but not limited to other conditions, statuses, identification, or statistics related to the fluid recipient to which the receiver is installed.

In one example, the supply conduit 14 includes a coupling assembly 32 incorporating a swivel mechanism having a coupling component 34 secured directly to the nozzle 12, and a contra-rotating component 36 connected to the supply line 22. The coupling assembly 32 of this embodiment is designed for contra-rotation allowing inlet and outlet process connections to rotate independently. The electronics module 20 is located at the contra-rotating component 36 of the coupling assembly 32. The coupling assembly 32 is detachably fitted to the nozzle 12 wherein removal of the coupling assembly 32 from the nozzle 12 renders the electrical identification circuit 30 inoperable. In an alternative arrangement, the supply conduit may include a supply line detachably fitted to a coupling assembly which is effectively integral with the nozzle.

In this embodiment, the electronics module 20 includes a processor (not shown) configured to receive the unique receiver identifier or ID code via the electrical identification circuit 30 and process it to obtain the data to be sent to the controller 26. The receiver ID code and other recipient data received from the receiver 16 may be sent from the electronics module 20 to the controller 26 with or without any processing. If the recipient data is not processed the data sent to the controller is substantially identical to the ID code received from the receiver identification device 18. The processor is operatively coupled to a wireless transmitter 38 arranged to wirelessly send the data to a wireless data receiver 40 associated with the controller 26. The wireless transmitter 38 and wireless data receiver 40 thus communicate across a first wireless pathway 42. The electronics module 20 includes a power source (not shown) operatively coupled to the processor and the wireless transmitter 38 to power them.

The fluid dispensing system 10 of this embodiment also comprises a nozzle identification device 44 associated with the dispensing nozzle 12. The identification device 44 is configured to provide nozzle data including a unique nozzle identifier or nozzle ID code associated with the nozzle 12 which is sent to the electronics module 20 at the supply conduit 14. The nozzle identification device 44 is in the form of a nozzle identification tag arranged to wirelessly communicate the nozzle ID code to a wireless data receiver 46. The wireless data receiver 46 is associated with the electronics module 20 at the supply conduit 14. In this example the processor of the electronics module 20 is configured to receive the nozzle data including the unique nozzle ID code and process it to obtain data. The nozzle ID code may be sent from the electronics module 20 to the controller 26 without any processing in which case the validation data is substantially identical to the ID code. The unique nozzle ID code is communicated to the wireless data receiver 46 across a second wireless pathway or link 48 and the data is communicated to the controller 26 across the first wireless pathway 42.

Although not illustrated, the system 10 may include an anti-theft feature or circuit extending between the electronics module and the supply line. This circuit is of a single hardwired configuration and is typically of a relatively low electrical resistance. If the supply line is removed from the coupling assembly, the low resistance anti-theft circuit is activated triggering transmission of a signal from the electronics module to the controller. Upon receipt, the controller may respond in a variety of means including termination or closure of the fluid supply line, and activating a system alarm to alert a system operator(s).

It will be understood that this communication of the unique nozzle ID code from the dispensing nozzle 12 to the electronics module 20 at the coupling assembly 32 is separate and independent from the electrical identification circuit 30 associated with the receiver 16. The unique nozzle ID code is assigned within the system 10 to the nozzle 12 to which it is mounted or otherwise installed. This provides a means within the system 10 to identify a nozzle such as 12 associated with each supply line. The nozzle identification device or tag 44 within the nozzle 12 also provides means within the system 10 to detect once a nozzle such as 12 is disconnected (detached or removed from) the coupling assembly 32 to which it has been associated within the system 10. The nozzle 12 having its unique ID code is thus associated or paired with the electronics module 20. If the nozzle 12 is removed or replaced, the system 10 is configured to deactivate an associated supply line or other fluid dispensing line.

In this embodiment, fluid transfer at the dispensing nozzle 12 is authorised depending on validation of the data delivered to the controller 26 and associated with the dispensing nozzle 12. The data is compared or validated with corresponding data associated with the dispensing nozzle 12 and stored at the controller 26. The dispensing of fluid may only be authorised when the data associated with the dispensing nozzle 12 is recognised at the controller 26. The system 10 is thus designed wherein the controller 26 may not authorise fluid transfer at the dispensing nozzle 12 without the requisite validation data being delivered from the electronics module 20.

The fluid dispensing system 10 of this embodiment also comprises a remote server 50 which is typically configured to communicate with the controller 26, for example across a wireless or hard-wired network. In line with a conventional fuel management system, the server 50 supports software which provides reporting, user interface, monitoring, systems status information, and other relevant functionality. Generally, the server 50 interfaces with each of a plurality of controllers such as 26 installed in areas where the fluid or other assets are dispensed or recovered.

Figure 3:
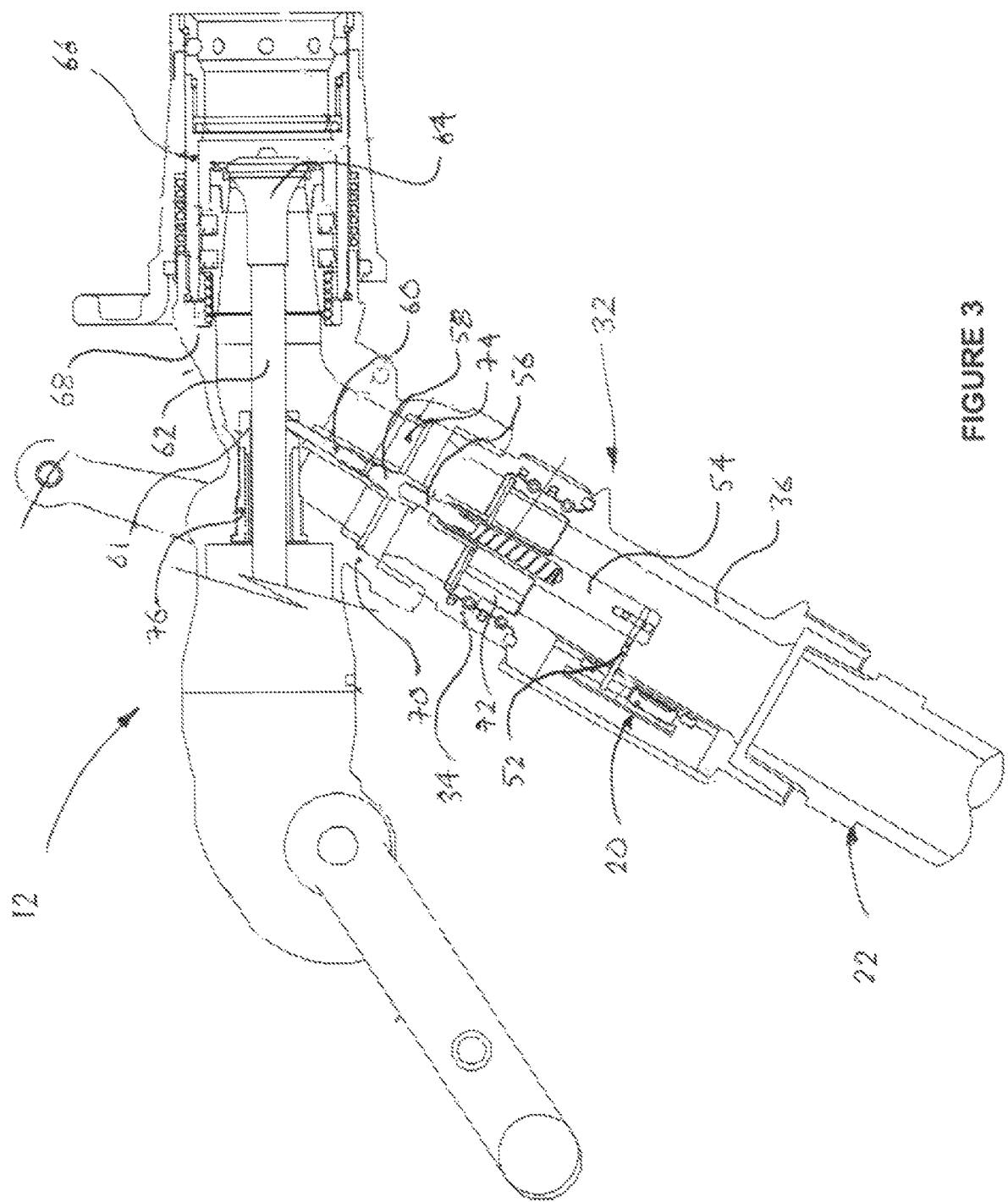
FIG. 3 is a part sectional view of the dispensing nozzle taken from the fluid dispensing system of the preceding figures.
Figure 4:
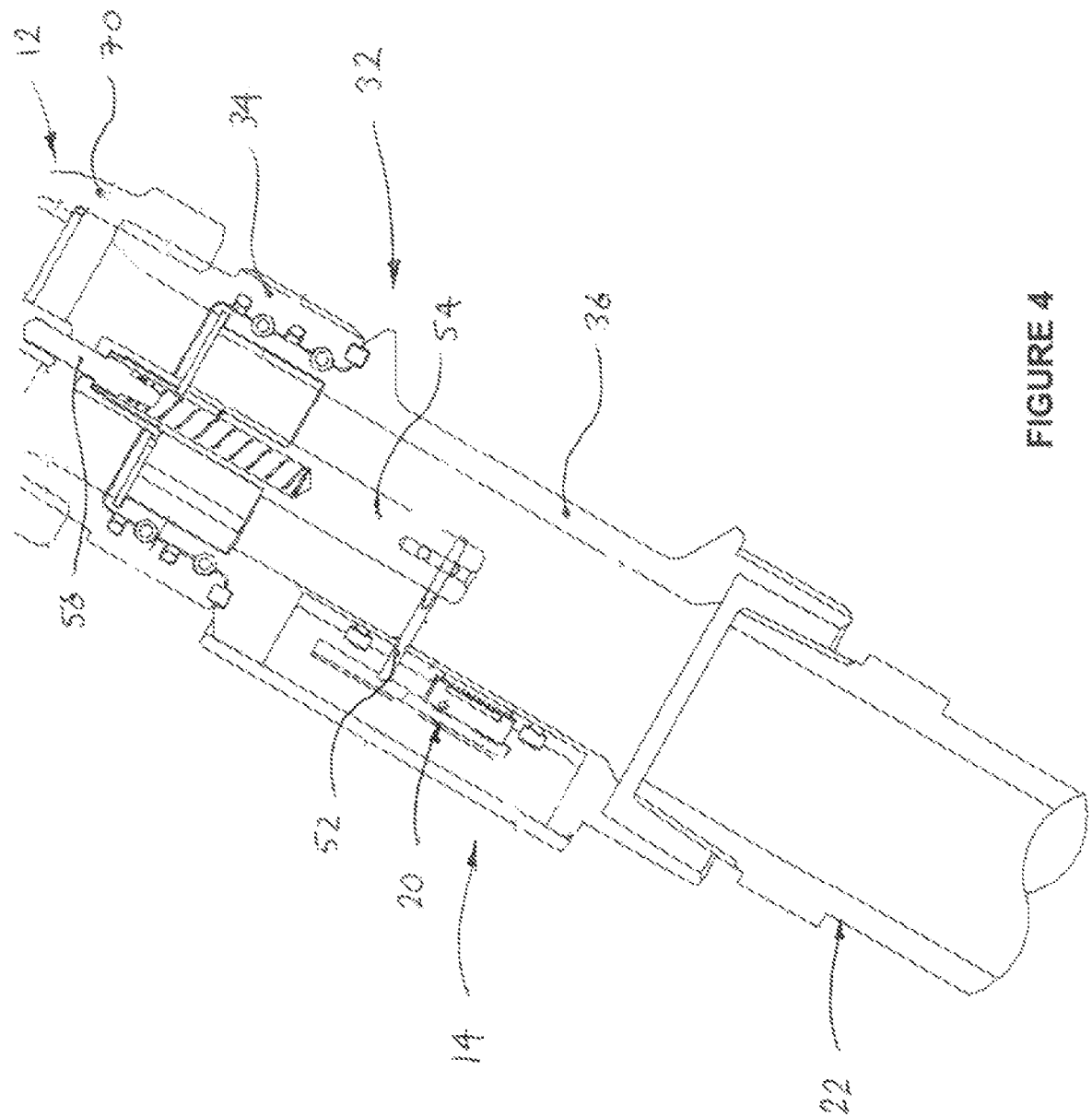
FIG. 4 is an enlarged sectional view of part of the dispensing nozzle of FIG. 3 and its associated supply conduit.
Figure 5:
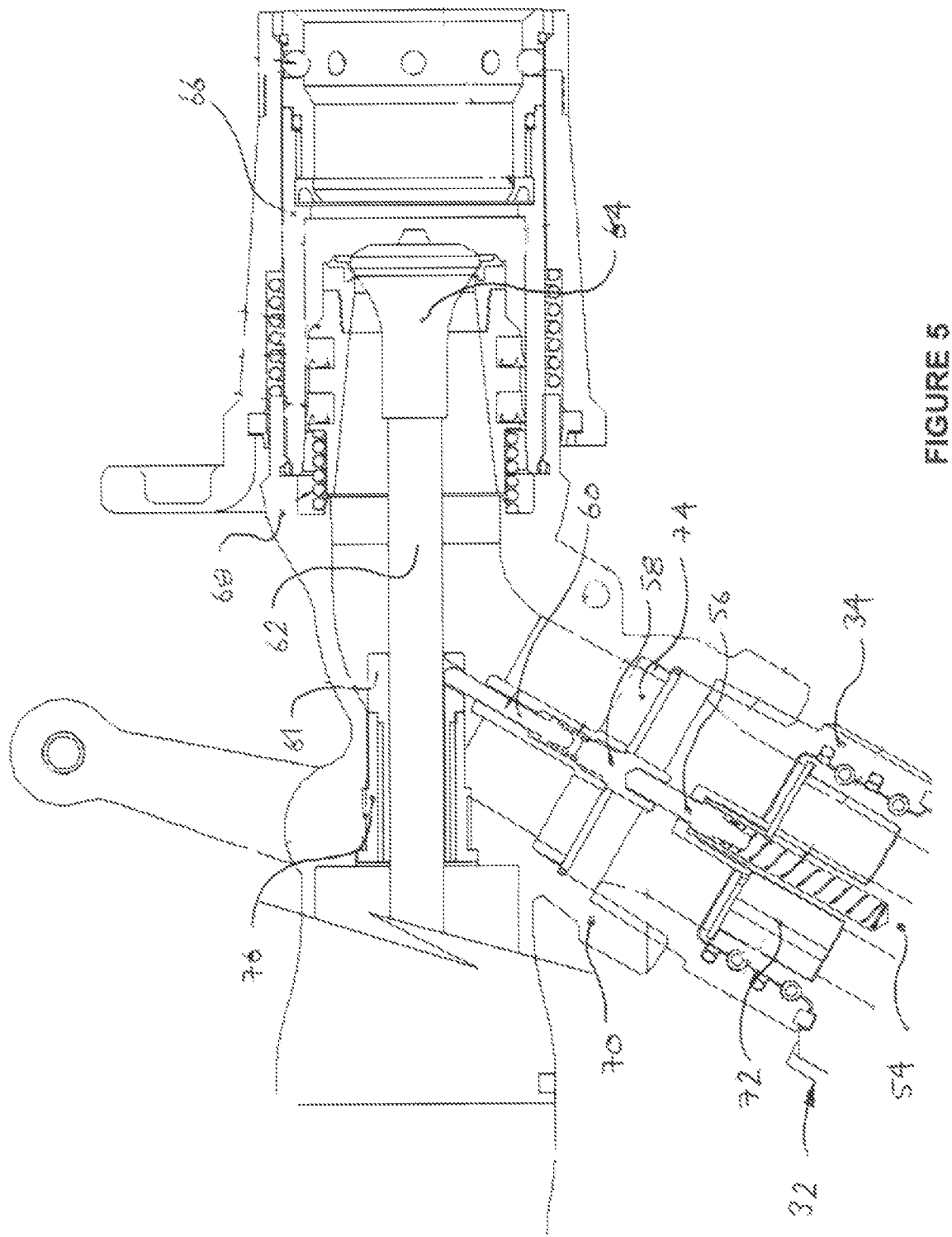
FIG. 5 is an enlarged sectional view of part of the dispensing nozzle of the preceding figures.

FIGS. 3 to 5 are sectional views of the dispensing nozzle 12 taken from the fluid dispensing system 10 of the preceding embodiment. The dispensing nozzle 12 is shown removed from the compatible receiver 12 and arranged in its normally-closed condition. In addition to the components of the dispensing nozzle 12 already described these illustrations depict other features associated with the electrical identification circuit 30 in greater detail. As best seen in FIG. 3, an active path of the electrical identification circuit 30 of the nozzle 12 includes:

1. an electronics conductor probe 52 extending radially inwardly from the electronics module 20;
2. a first conductor probe 54 connected to the electronics probe 52 and extending longitudinally of the coupling assembly 32;
3. a second conductor probe 56 contacting and extending axially from the first probe 54;
4. a nozzle conductor probe 58 contacting the second probe 56 at one end;
5. a second nozzle conductor probe 60 contacting and extending from the first nozzle probe 58;
6. a conducting bush 61 mounted about a conductor tube 62 associated with a poppet head 64, the second nozzle probe 60 contacting the bush 61 and the tube 62 extending longitudinally within the nozzle 12.

The electrical circuit 30 on a return or ground path of the nozzle 12 includes:

1. a mating nozzle body portion 66 configured to key or latch with a compatible receiver such as 16;
2. a main body portion 68 with which the mating nozzle portion 66 is connected;
3. a tail connection part 70 formed continuous with the main body portion 68;
4. the coupling component 34 of the coupling assembly 32 mounted to the tail part 70;
5. the contra-rotating component 36 of the coupling assembly 32 providing completion of the ground path to the electronics module 20.

In order to insulate the electrical identification circuit 30 to avoid a short circuit, the dispensing nozzle 12 and associated coupling assembly 32 include:

1. a probe guide insulator 72 mounted within the coupling component 34 of the coupling assembly 32 and disposed about the first probe 54;
2. a nozzle probe guide insulator 74 mounted within the tail part 70 of the nozzle 12 and disposed about the first nozzle probe 58;
3. an insulating bush 76 mounted within the main body 68 of the nozzle 12 and disposed about the conducting bush 61.

Figure 6:
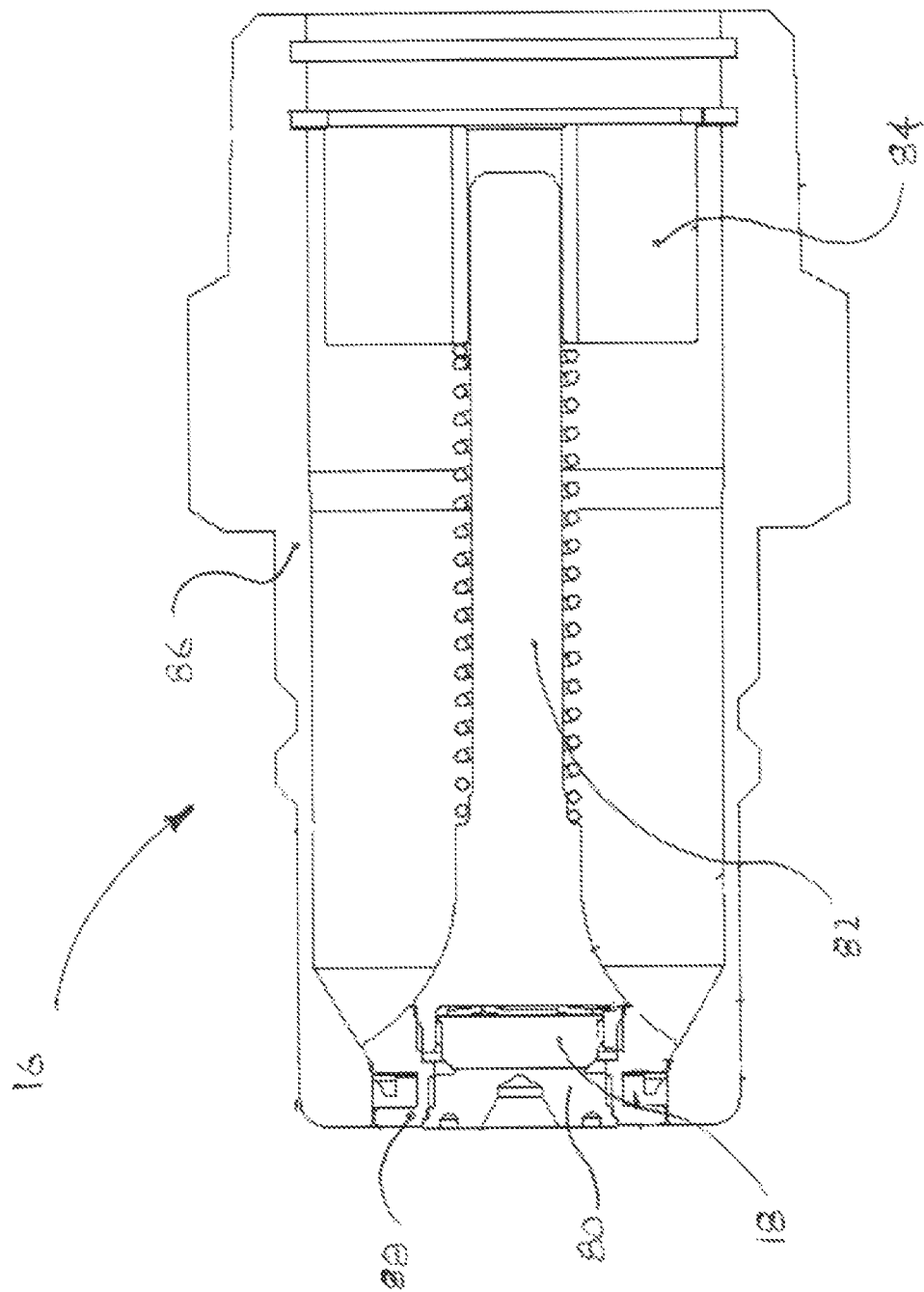
FIG. 6 is a sectional view of a receiver taken from the fluid dispensing system of FIGS. 1 and 2.

FIG. 6 shows the receiver 16 taken from the fluid dispensing system 10 of the preceding embodiment in greater detail. In addition to the receiver 16 components already designated, the receiver 16 includes active and ground paths of the electrical identification circuit 30 including:

1. a poppet conductor contact 80 in contact with and retaining the receiver identification device or tag 18 and configured for contact with the poppet head 64 of the dispensing nozzle 12 (see FIG. 1);
2. a poppet conductor stem 82 at one end housing and in contact with the receiver identification tag 18;

3. a poppet conductor guide 84 within which the poppet stem 82 is slidably received;
4. a receiver body 86 within which the poppet guide 84 is mounted, the receiver body 86 being designed for mating contact with the mating portion 66 of the dispensing nozzle 12 (see FIG. 1).

The receiver 16 includes a poppet head 88 which acts as an insulator between the poppet contact 80 and the poppet stem 82, and the receiver body 86. The integrity of the electrical identification circuit 30 on the receiver 16 side is thus maintained without a risk of short circuit.

Figure 7:
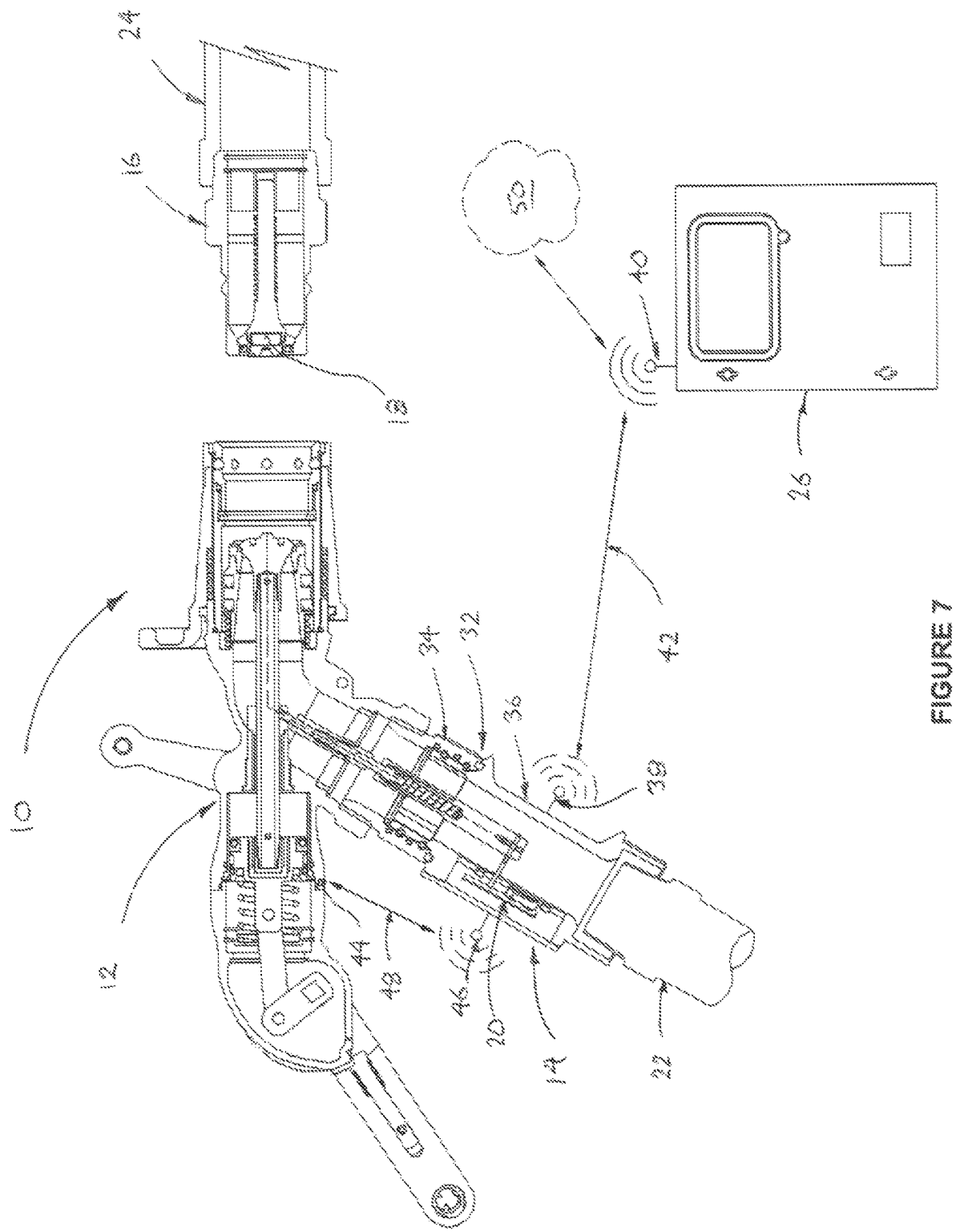
FIG. 7 is a sectional view of the fluid dispensing system of FIGS. 1 and 2 with the dispensing nozzle detached from the receiver.
Figure 8:
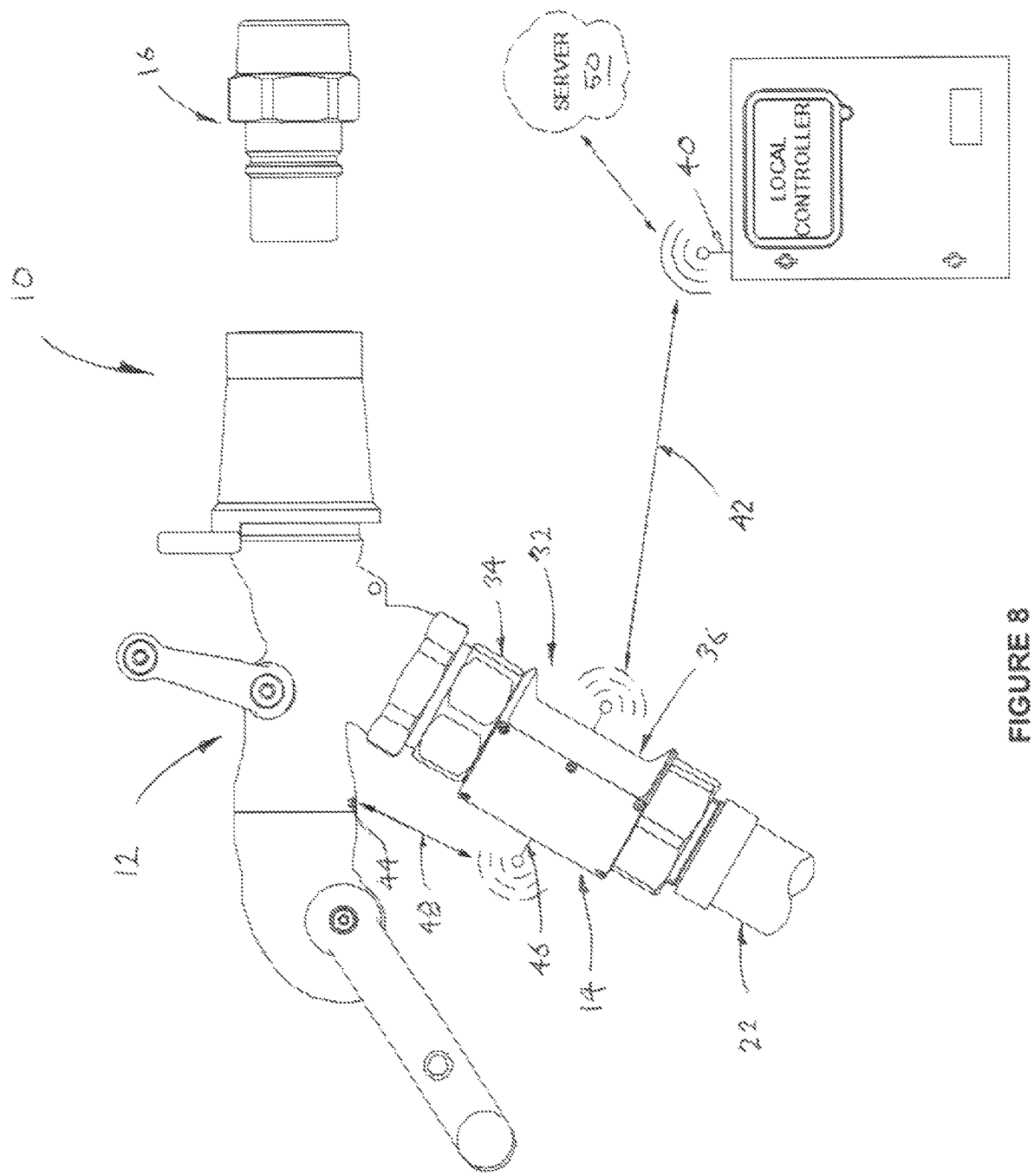
FIG. 8 is a schematic illustration of the fluid dispensing system of FIG. 7 with the dispensing nozzle and receiver detached from one another.

FIGS. 7 and 8 are further illustrations of the fluid dispensing system 10 of the preceding embodiment but in this case with the dispensing nozzle 12 detached from the receiver 16. The system 10 is configured so that movement of the dispensing nozzle 12 energises the electronics module 10 from an idle or standby mode to an active mode. The electronics module 20 may include a motion sensor such as accelerometer to detect movement. In the active mode the electronics module 20 provides a voltage across active and ground paths of the electrical identification circuit 30 of the nozzle 12 only, utilising the electrical power source. In the standby mode, energy is conserved as the electronics module 20 consumes less power in this condition i.e. voltage is not applied to the active and ground paths of the identification circuit 30. Importantly, the identification circuit 30 is not completed unless the electronics module 20 is active and the nozzle 12 is connected to the receiver 16 and this is best seen in FIG. 1.

In order to facilitate a better understanding of this preferred embodiment, the general steps involved in operation of the fluid dispensing system 10 are as follows:
1. an operator removes the nozzle such as 12 which is in the standby mode from a storage holster;
2. the electronics module such as 20 detects this movement of the nozzle 12 wherein the electronics module 20 shifts to its active mode;
3. the electronics module 20 applies voltage to the active and ground paths of the identification circuit 30;
4. the nozzle ID code is transmitted to the electronics module 20 which transmits it or derived data to the controller 26 for recognition and validation of the nozzle 12;
5. the operator connects the nozzle 12 to the receiver 16 to complete and thus enable the identification circuit 30;
6. the receiver ID code and possibly other recipient data is transferred from the receiver identification device or tag 18 via the identification circuit 30 to the electronics module 20;
7. the electronics module 20 transmits the receiver ID code and possibly recipient data to the controller 26;
8. the controller 26 verifies the receiver ID code and processes any other recipient data;
9. the controller 26 instructs relevant field devices to enable a supply line associated with the nozzle 12;
10. the operator opens the dispensing nozzle 12 for dispensing of the fluid via the supply line.

Throughout the fluid transfer event, the electronics module 20 may periodically send nozzle and/or receiver ID codes to the controller 26 as verification. When the dispensing nozzle 12 is disconnected from the receiver 16, the electronics module 20 detecting disabling of the identification circuit 30 communicates this disablement with the controller 26. The controller 26 may instruct field devices to disable a supply line thereby terminating the supply of fluid. The dispensing nozzle 12 of this embodiment on return to the storage holster and after a preset period of inactivity reverts the electronics module 20 to the standby mode. The data associated with the fluid transfer event or transaction may be sent from the controller 26 to the system 50 for the purposes of recordation and reconciliation of fluid stocks.

The electronics module 20 may also be configured to provide a unique electronics identifier associated with the coupling assembly 32 or other supply conduit. The unique electronics identifier may be sent to the controller 26 for "pairing" which is only effective if the unique identifier is registered or otherwise assigned at the controller 26. The system 10 may then be configured to only authorise the dispensing of fluid when the electronics module 20 is successfully paired with the controller 26.

The dispensing system 10 may also be configured to permit external devices to interface with the electronics module 20. This may be a wireless interface for purposes including but not limited to firmware/programming updates, reactivation and deactivation, system health checks, and diagnostics. The electronics module may include security means designed to prevent unauthorised or improper programming, activation, deactivation or similar tampering. The electronics module 20 may be shielded to for example prevent adverse effects from external radio frequency (RF) noise. The electronics module 20 may be of a modular construction to allow segments or sub-assemblies to be removed for servicing or replacement. On removal on any such electronics segments, the electronics module 20 may be rendered inoperable. The electronics module 20 may also include tamper features where for example the electronics module 20 is deactivated in the event certain fasteners or other components are removed.

The electronics module 20 is preferably associated with an electrical power source in the form of a battery pack or module which can be replaced independent of the electronics module 20. In order to conserve power, the sampling rate for the identification circuit 30 in addition to the wireless communication pathway such as 42 with the controller 26 may be optimised. For example, a high frequency sampling rate such as sampling every 0.5 seconds may be deemed too fast and consume excessive power whereas a less frequent sampling rate such as sampling every 60 seconds may be considered too slow and possibly compromising the security of the system whilst consuming less power. It is likely that the sampling rate and communication frequency will be configured depending on the application to which the dispensing system 10 is deployed.

The fluid dispensing system 10 or preferably the electronics module 20 may also be configured under predetermined circumstances to revert to a fault state which may occur on loss of:
1. the receiver ID code or other recipient data at the electronics module 20 where for example the electronics module 20 fails to receive or "poll" the receiver identification device or tag 18 via circuit 30 for a preset continuous period;
2. the nozzle ID code or other nozzle data at the electronics module 20 where for example the electronics module 20 fails to receive or "poll" the nozzle identification device or tag 44 via link 48 for a preset continuous period;
3. signal to the electronics module 20 indicating possible detachment of a supply line from the coupling assembly 32.

In the event the system 10 reverts to the fault state, the controller 26 receives a fault code from the electronics module 20 which automatically prompts the controller 26 to take predetermined actions. For example, the controller 26 may instruct field devices to cease the transfer of fluid via the supply line.

Figure 9:
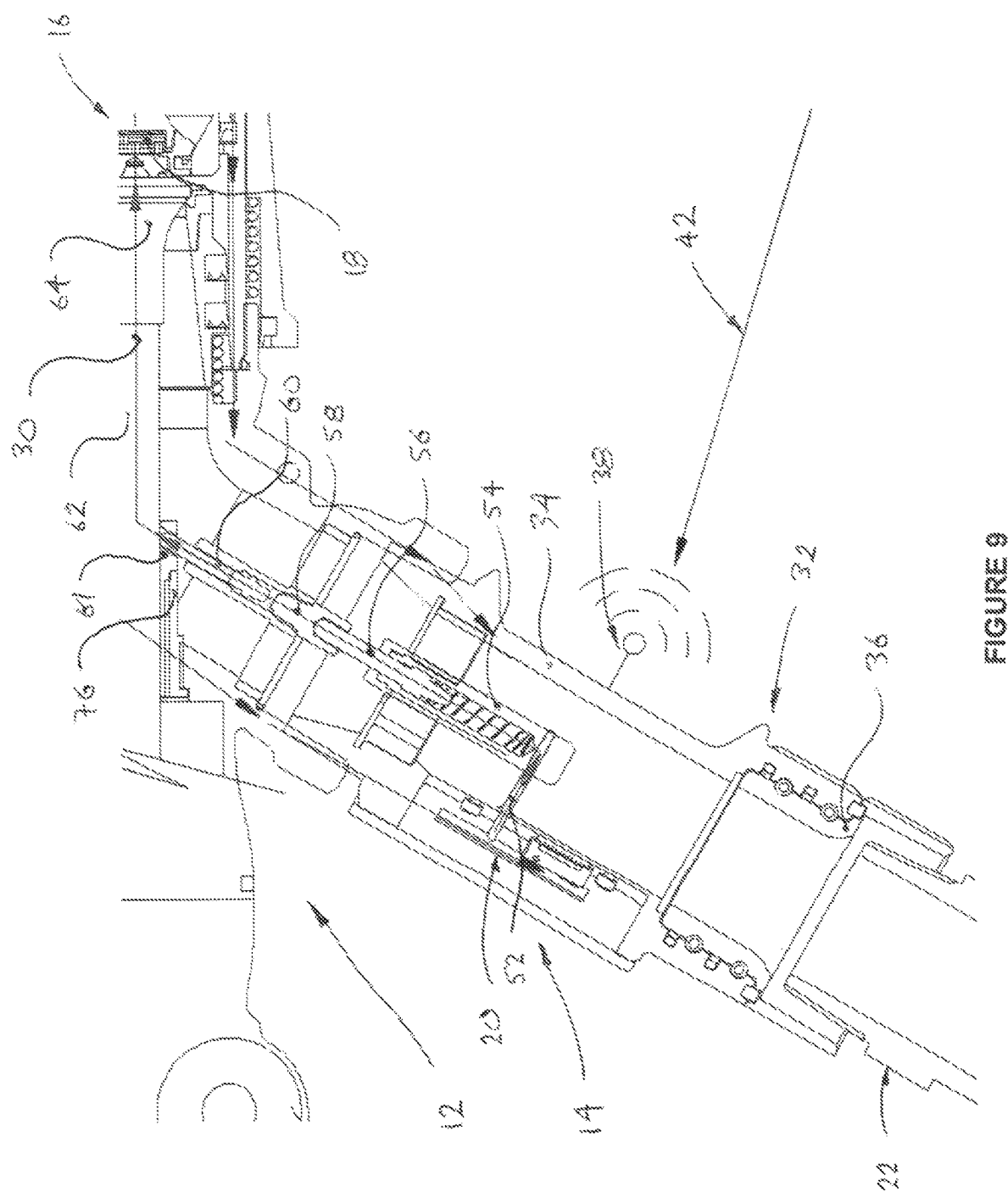
FIG. 9 is an enlarged sectional view of part of a fluid dispensing system according to another embodiment of the invention.

FIG. 9 illustrates another embodiment of the invention where in this case the electronics module 20 is located in the coupling component 34 of a coupling assembly 32. This configuration may be used where rotation of the electronics module 20 in relation to the dispensing nozzle 12 is prohibited. This arrangement may also be better suited to installations where better "alignment" of both wired and wireless communication links is required between the electronics module 20 mounted within the coupling assembly 32, and the dispensing nozzle 12. Otherwise, this other embodiment is of substantially identical construction and configuration to the preceding embodiment.

Figure 10:
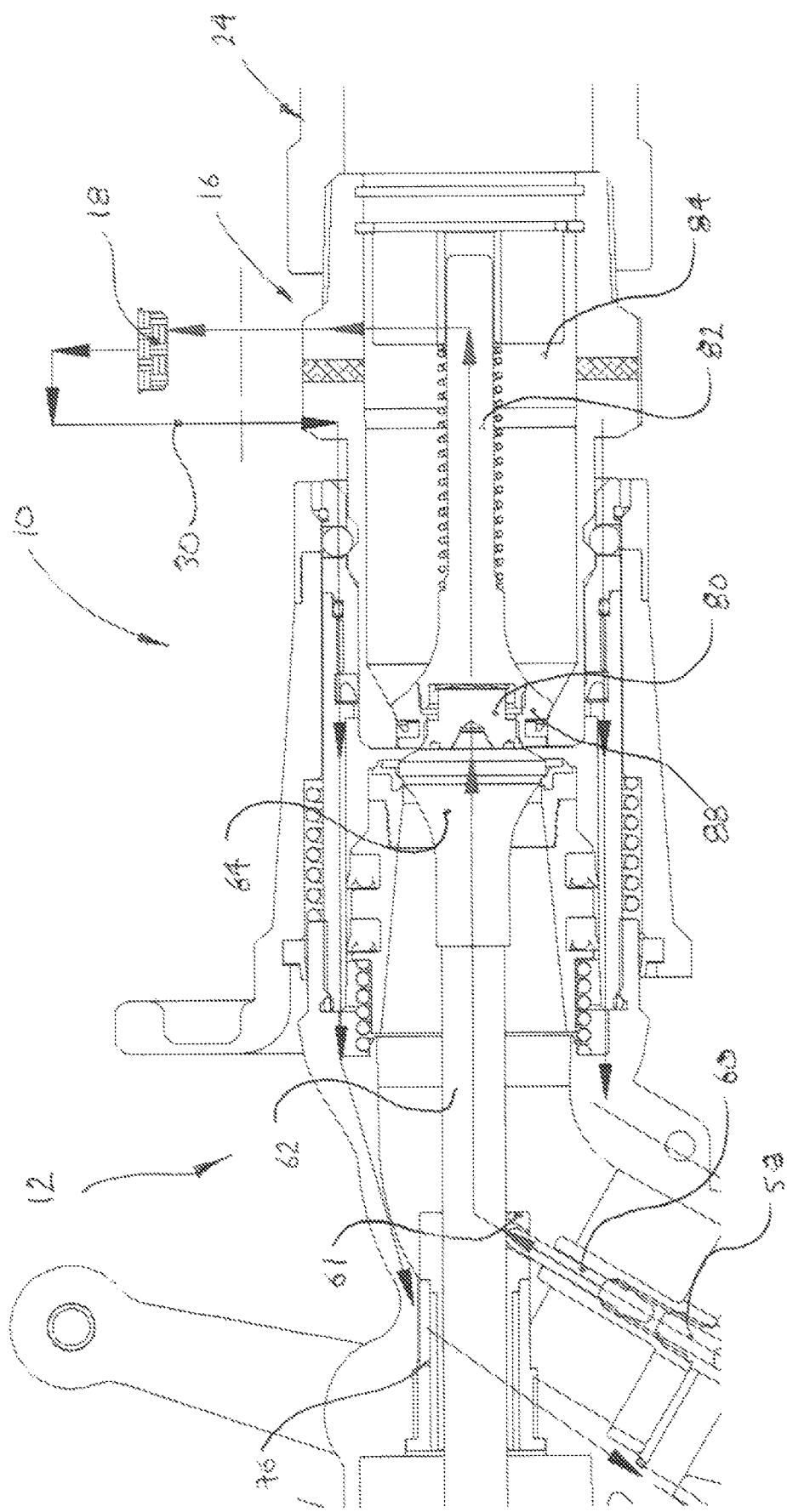
FIG. 10 is an enlarged sectional view of part of a fluid dispensing system according to a further embodiment of the invention.

FIG. 10 depicts a further embodiment of the invention but with the receiver identification device or tag 44 installed external to the receiver 16 itself. The receiver identification tag 44 nonetheless remains part of and integral to the electrical identification circuit 30. It is expected that this further embodiment may include a frangible link (not shown) between the receiver 16 and the external identification device or tag 44. This frangible link would break and disable the identification circuit 30 in the event that the receiver 16 was removed from the delivery coupling or other fluid recipient inlet. In this configuration, it is expected that the identification circuit would need to be appropriately insulated within the receiver 16 and into the external identification tag 44 in order to isolate the active and ground paths.

Figure 11:
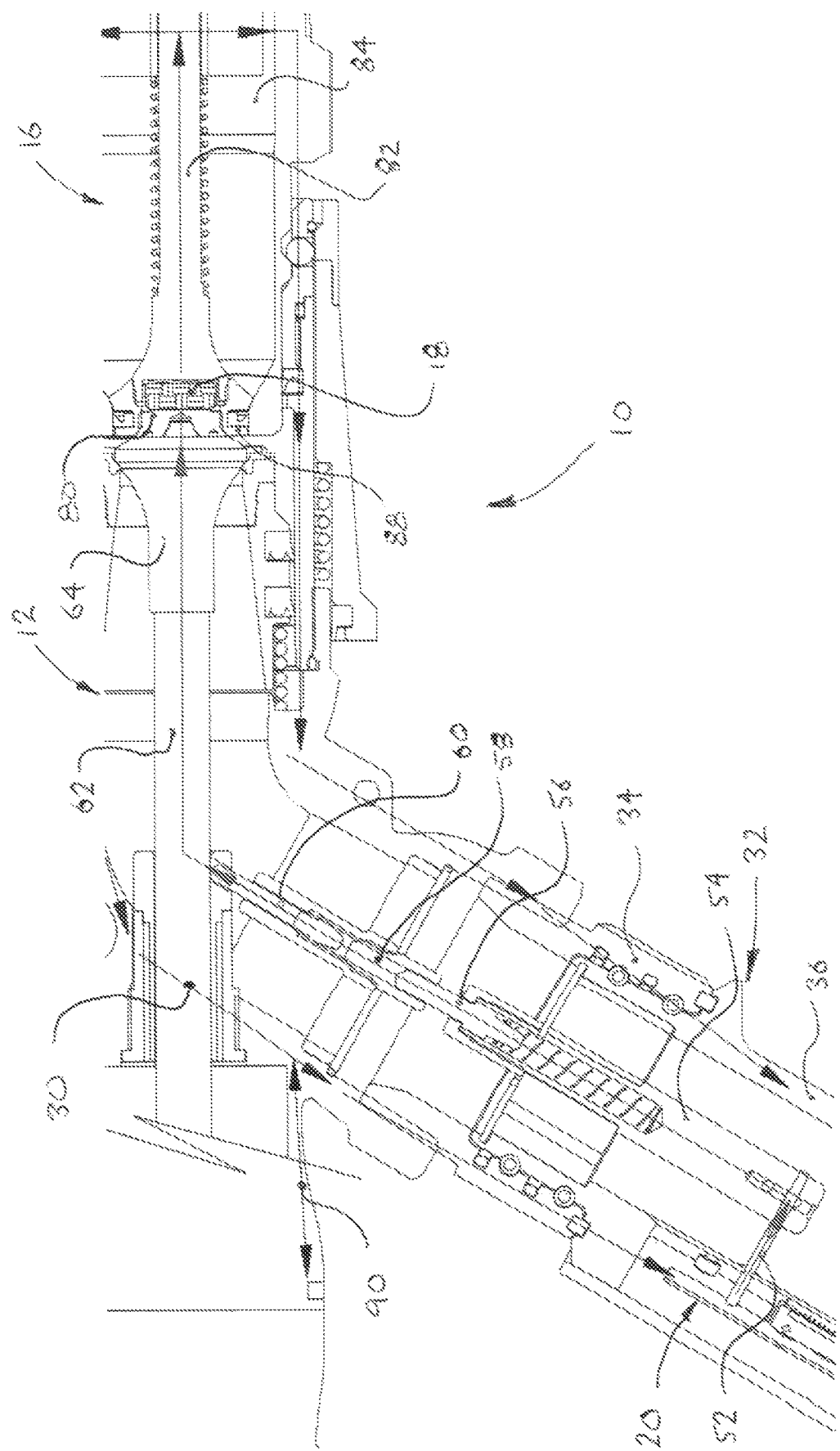
FIG. 11 is an enlarged sectional view of part of a fluid dispensing system according to yet another embodiment of the invention.

FIG. 11 shows yet another embodiment of the fluid dispensing system where in this case the communications link between the nozzle identification device or tag 44 and the electronics module 20 is a hardwired link. This hardwired link is designated at 90 and is connected to the ground path of the identification circuit 30. This embodiment is otherwise identical to the preferred embodiment of the fluid dispensing system 10.

Figure 12:
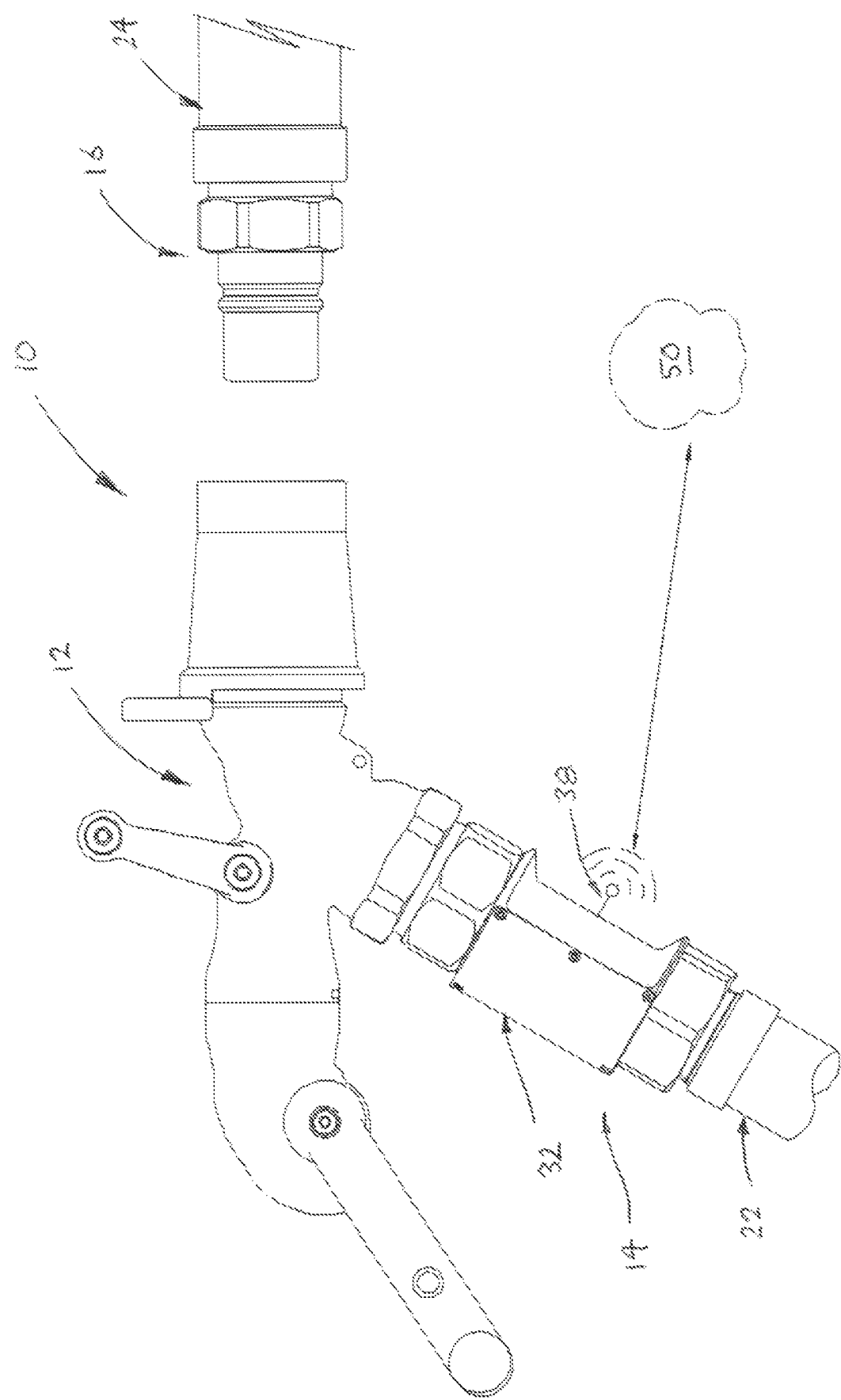
FIG. 12 is a schematic illustration of a fluid dispensing system according to yet a further embodiment of the invention.

FIG. 12 illustrates yet a further embodiment of the dispensing system but without the controller 26 of the preceding embodiments. In this departure, the electronics module 20 at the supply conduit 14 incorporates the core functionality of the controller 26 of the preceding embodiments and system communication occurs directly between the electronics module 20 and the server such as 50.

Now that several preferred embodiments of the fluid dispensing system have been described it will be apparent to those skilled in the art that they have at least the following advantages over the admitted prior art:
1. the security of the system is enhanced by locating or otherwise associating the electronics module with the supply conduit or more particularly the coupling assembly which may incorporate a swivel;
2. the system lends itself to additional security features preventing unauthorised dispensing or recovery of fluid;
3. the system includes various anti-tampering means intended to prevent unauthorised activation, modification, or other "hacking" of the system;
4. the system lends itself to both fluid dispensing and fluid recovery including the reclamation or evacuation of fluid or other assets;
5. the system can be adapted or retrofitted to existing fluid or other asset management systems.

Those skilled in the art will appreciate that the invention as described herein is susceptible to variations and modifications other than those specifically described. For example, the dispensing nozzle and receiver need not be of a dry-break configuration provided "connection" of the dispensing nozzle to the receiver permits contact-based communication of a unique receiver identifier to an electronics module associated with a supply conduit connected to the nozzle. The contact-based identification circuit may be configured different to the specific design of the preferred embodiment where for example the active and ground paths are located alongside but insulated from one another. The electronics module may be mounted or otherwise secured to the supply line or other section of the supply conduit rather than a coupling assembly. All such variations and modifications are to be considered within the scope of the present invention the nature of which is to be determined from the foregoing description.

The invention claimed is:

1. A fluid dispensing system comprising:
    a dispensing nozzle coupled to a supply conduit for dispensing fluid from a fluid supply associated with the supply conduit, said supply conduit including a coupling assembly connected directly to an inlet of the dispensing nozzle;
    a receiver adapted to couple to a fluid recipient, the dispensing nozzle being detachably connected to the receiver for dispensing the fluid from the fluid supply and delivering it to the fluid recipient;
    a receiver identification device associated with the receiver, said identification device configured to provide recipient data including but not limited to a unique receiver identifier associated with the fluid recipient;
    an electrical identification circuit being contact-based and including the receiver identification device;
    an electronics module connected to the supply conduit at the coupling assembly and arranged to communicate with the electrical identification circuit whereby connection of the dispensing nozzle to the receiver completes the electrical identification circuit and permits communication of the recipient data to the electronics module.

2. A fluid dispensing system as claimed in claim 1 wherein the receiver identification device includes a receiver identification tag forming part of the electrical identification circuit, the electrical identification circuit hardwired to the electronics module via the dispensing nozzle for completion of said circuit on connection of the dispensing nozzle to the receiver.

3. A fluid dispensing system as claimed in claim 1 wherein the dispensing nozzle and the receiver are of a dry-break design, the dry break nozzle and the receiver being compatible to permit connection.

4. A fluid dispensing system as claimed in claim 1 wherein the coupling assembly is detachably fitted to the dispensing nozzle wherein removal of the coupling assembly from the dispensing nozzle breaks the electrical identification circuit.

5. A fluid dispensing system as claimed claim 1 wherein the supply conduit includes a supply line detachably fitted to the coupling assembly, said system also comprising an anti-theft feature extending between the electronics module and the supply line whereby removal of the supply line from the coupling assembly activates the anti-theft feature which is then communicated from the electronics module to the controller to allow predetermined actions.

6. A fluid dispensing system as claimed in claim 1 also comprising a nozzle identification device associated with the dispensing nozzle, said identification device configured to provide nozzle data including a unique nozzle identifier associated with the dispensing nozzle which is sent to the electronics module at the coupling assembly of the supply conduit, the electronics module arranged to communicate with the controller to deliver data obtained from the nozzle data to the controller whereby fluid transfer to the dispensing nozzle is authorised depending on the delivered data.

7. A fluid dispensing system as claimed in claim 6 wherein the nozzle identification device includes a nozzle identification tag arranged to provide the nozzle data to the electronics module at the coupling assembly of the supply conduit, the data obtained from the nozzle data being wirelessly communicated to the controller via a wireless transmitter of the electronics module for validation of the dispensing nozzle at the controller to authorise fluid transfer via the dispensing nozzle.

8. A fluid dispensing system as claimed in claim 1 also comprising a controller arranged to communicate with the electronics module to receive data obtained from the recipient data and delivered from the electronics module whereby dispensing of the fluid from the fluid supply is controlled by the controller depending on the received data.

9. A fluid dispensing system as claimed in claim 8 wherein the electronics module includes a processor operatively coupled to a wireless transmitter arranged to wirelessly send the data to a wireless data receiver associated with the controller, the processor configured to receive the recipient data and process it to obtain the data sent to the controller.

10. A fluid dispensing system as claimed in claim 9 wherein the electronics module includes a power source operatively coupled to the processor and the wireless transmitter to power them.

11. A fluid recovery system comprising:
   a recovery nozzle connected to a delivery conduit for delivering fluid to a fluid recipient associated with the delivery conduit, said delivery conduit including a coupling assembly connected directly to an outlet of the recovery nozzle;
   a receiver adapted to couple to a fluid supply, the dispensing nozzle being detachably connected to the receiver for recovering the fluid from the fluid supply and delivering it to the fluid recipient;
   a receiver identification device associated with the receiver, said identification device configured to provide supply data including but not limited to a unique receiver identifier associated with the fluid supply;
   an electrical identification circuit being contact-based and including the receiver identification device;
   an electronics module connected to the delivery conduit at the coupling assembly and arranged to communicate with the electrical identification circuit whereby connection of the recovery nozzle to the receiver completes the electrical identification circuit and permits communication of the supply data to the electronics module.

12. A fluid recovery system as claimed in claim 11 wherein the receiver identification device includes a receiver identification tag forming part of the electrical identification circuit, the electrical identification circuit hardwired to the electronics module via the recovery nozzle for completion of said circuit on connection of the recovery nozzle to the receiver.

13. A fluid recovery system as claimed in claim 11 wherein the recovery nozzle and the receiver are of a dry-break design, the dry break nozzle and the receiver being compatible to permit connection.

14. A fluid recovery system as claimed in claim 11 wherein the coupling assembly is detachably fitted to the recovery nozzle wherein removal of the coupling assembly from the recovery nozzle breaks the electrical identification circuit.

15. A fluid recovery system as claimed in claim 14 wherein the delivery conduit includes a delivery line detachably fitted to the coupling assembly, said system also comprising an anti-theft feature extending between the electronics module and the delivery line whereby removal of the delivery line from the coupling assembly activates the anti-theft feature which is then communicated from the electronics module to the controller to allow predetermined actions.

16. A fluid recovery system as claimed in claim 11 also comprising a nozzle identification device associated with the recovery nozzle, said identification device configured to provide nozzle data including a unique nozzle identifier associated with the recovery nozzle which is sent to the electronics module at the coupling assembly of the delivery conduit, the electronics module arranged to communicate with the controller to deliver data obtained from the nozzle data to the controller whereby fluid transfer at the recovery nozzle is authorised depending on the delivered data.

17. A fluid recovery system as claimed in claim 16 wherein the nozzle identification device includes a nozzle identification tag arranged to send the nozzle data to the electronics module at the coupling assembly of the delivery conduit, the data obtained from the nozzle data being wirelessly communicated to the controller via a wireless transmitter of the electronics module for validation of the recovery nozzle at the fluid controller to authorise fluid transfer via the recovery nozzle.

18. A fluid recovery system as claimed in claim 11 also comprising a controller arranged to communicate with the electronics module to receive data obtained from the supply data and delivered from the electronics module whereby recovery of the fluid from the fluid supply is controlled by the controller depending on the received data.

19. A fluid recovery system as claimed in claim 18 wherein the electronics module includes a processor operatively coupled to a wireless transmitter arranged to wirelessly send the data to a wireless data receiver associated with the controller, the processor configured to receive the supply data and to process it to obtain the data sent to the controller.

20. A fluid recovery system as claimed in claim 19 wherein the electronics module includes a power source operatively coupled to the processor and the wireless transmitter to power them.

* * * * *